(12) United States Patent
Takeda

(10) Patent No.: US 12,526,392 B2
(45) Date of Patent: Jan. 13, 2026

(54) INFORMATION PROCESSING APPARATUS AND METHOD, AND STORAGE MEDIUM FOR GENERATING ARBITRARY VIEWPOINT IMAGES

(71) Applicant: CANON KABUSHIKI KAISHA, Tokyo (JP)

(72) Inventor: Eishi Takeda, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 122 days.

(21) Appl. No.: 18/586,655

(22) Filed: Feb. 26, 2024

(65) Prior Publication Data

US 2024/0305760 A1     Sep. 12, 2024

(30) Foreign Application Priority Data

Mar. 7, 2023   (JP) .................................. 2023-034928

(51) Int. Cl.
   *H04N 13/117*   (2018.01)
   *G06T 7/20*     (2017.01)
   *G06T 7/70*     (2017.01)

(52) U.S. Cl.
   CPC ............. *H04N 13/117* (2018.05); *G06T 7/20* (2013.01); *G06T 7/70* (2017.01)

(58) Field of Classification Search
   CPC ............ H04N 13/117; G06T 7/70; G06T 7/20
   See application file for complete search history.

(56) References Cited

U.S. PATENT DOCUMENTS

| | | | | |
|---|---|---|---|---|
| 2013/0147931 A1* | 6/2013 | Ohba | ................... | H04N 13/383 348/54 |
| 2015/0009308 A1* | 1/2015 | Chiba | ................. | H04N 13/366 348/54 |
| 2020/0084426 A1* | 3/2020 | Maruyama | ............. | H04N 5/268 |
| 2020/0265633 A1* | 8/2020 | Okutani | ................. | G06F 3/012 |
| 2022/0245887 A1* | 8/2022 | Ogawa | .................... | G06T 15/20 |
| 2023/0269356 A1* | 8/2023 | Kawabata | .............. | H04N 23/90 348/48 |

FOREIGN PATENT DOCUMENTS

| | | | |
|---|---|---|---|
| JP | H10-232934 A | | 9/1998 |
| JP | 2000-048184 A | | 2/2000 |
| JP | 2010268048 A | * | 11/2010 |

* cited by examiner

*Primary Examiner* — Terrell M Robinson
(74) *Attorney, Agent, or Firm* — Carter, DeLuca & Farrell LLP

(57) ABSTRACT

An information processing apparatus comprises: an input unit that inputs first image data used to display an image in a first mode and second image data used to display an image in a second mode; a switching unit that switches between the first and second modes; a generation unit that generates an image viewed from an arbitrary viewpoint based on the second image data; a designation unit that designates a viewpoint of an image to be generated by the generation unit; and a storage unit that stores the viewpoint of the image generated by the generation unit. The first and second image data are obtained by shooting a same subject in parallel with a plurality of image capturing apparatuses, and if a viewpoint is stored when the first mode is switched to the second mode, the designation unit designates the stored viewpoint.

12 Claims, 17 Drawing Sheets

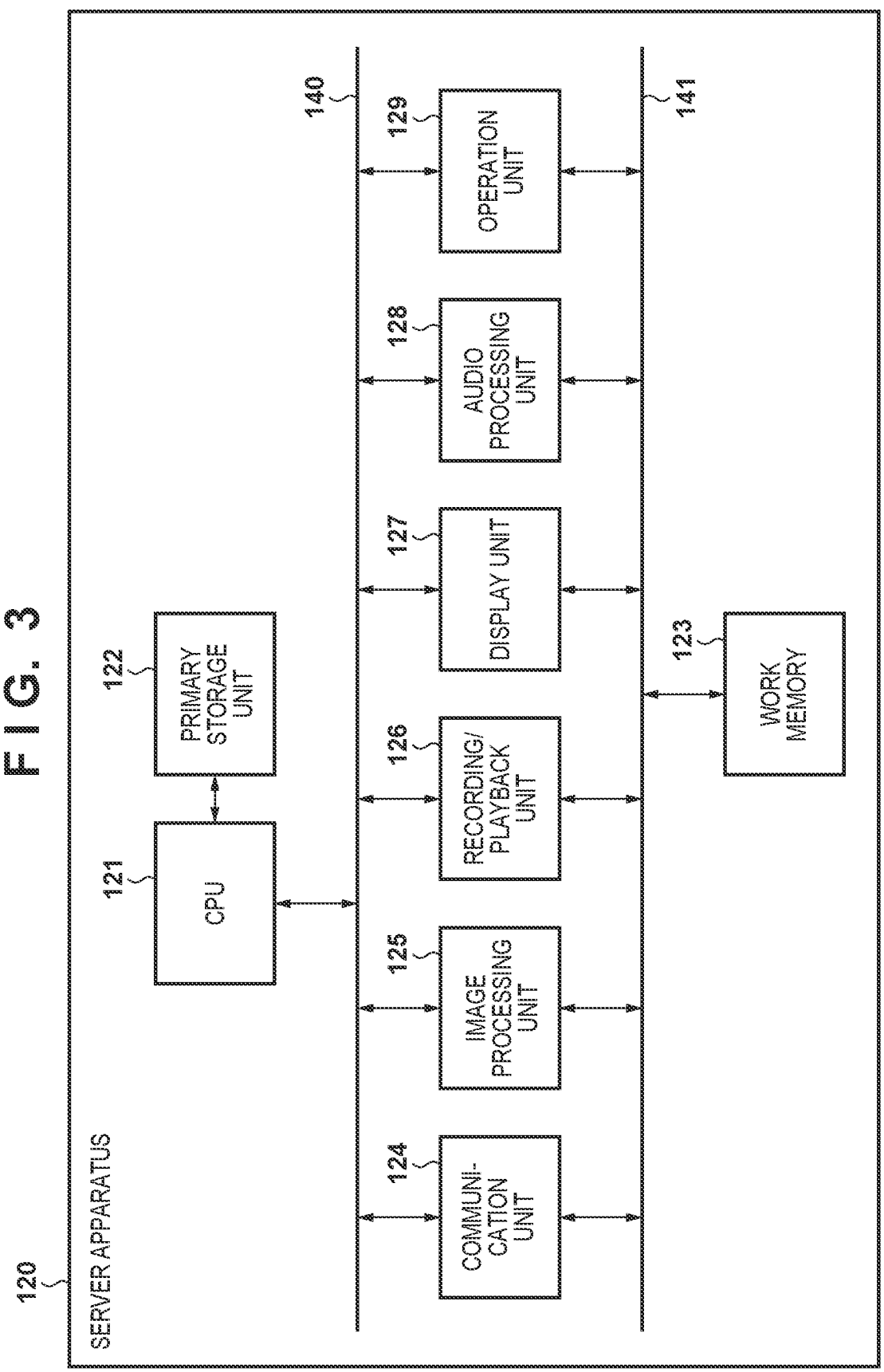

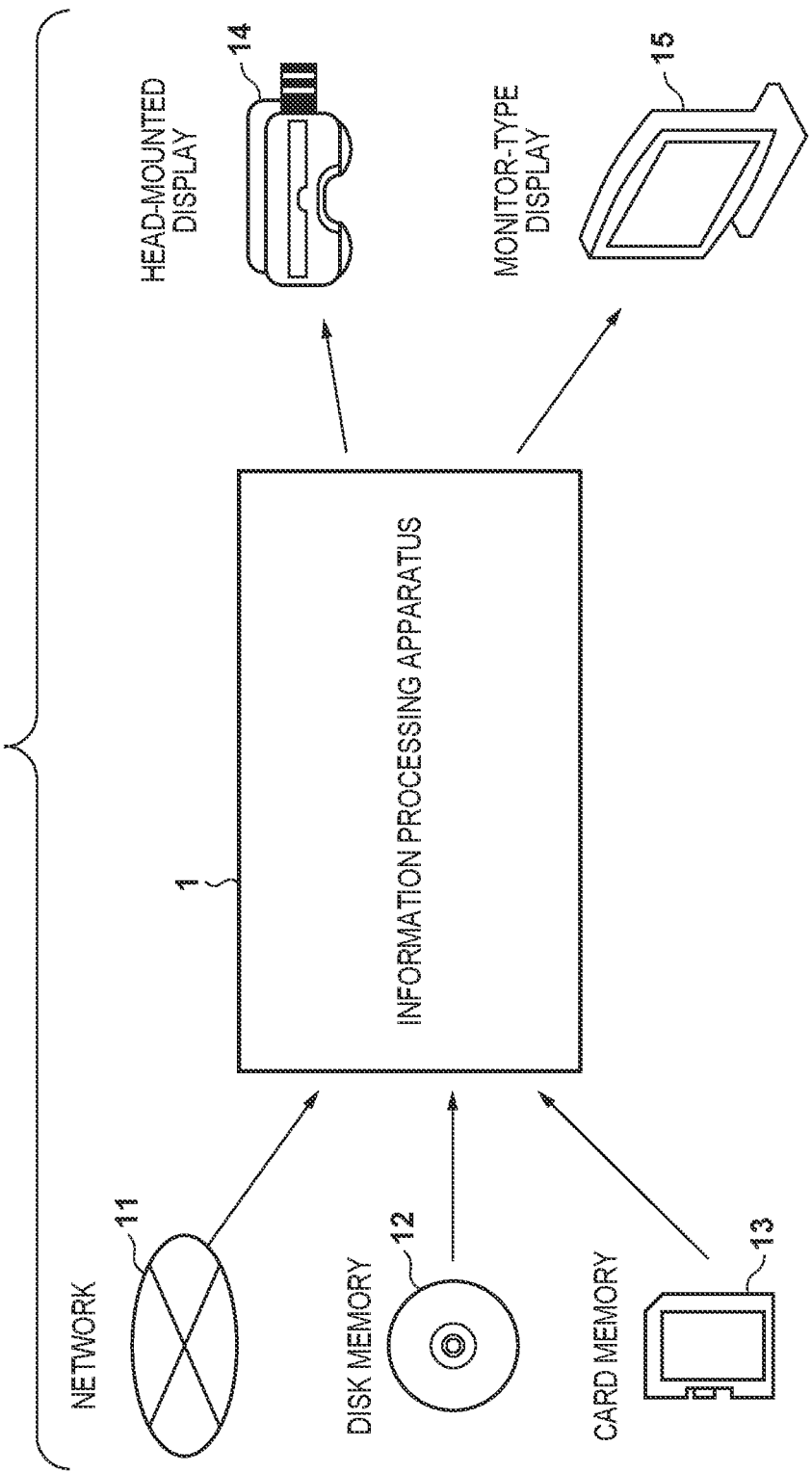

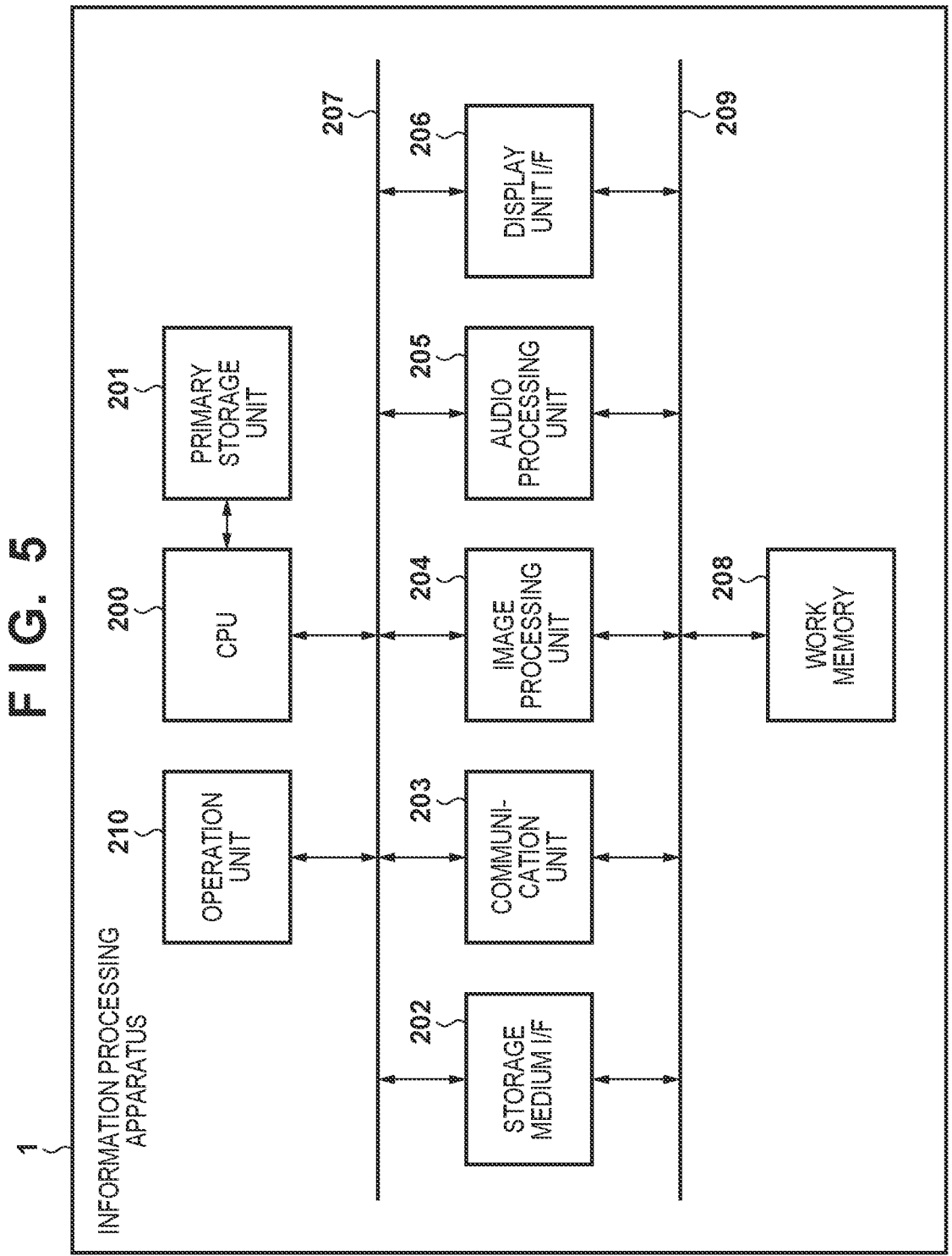

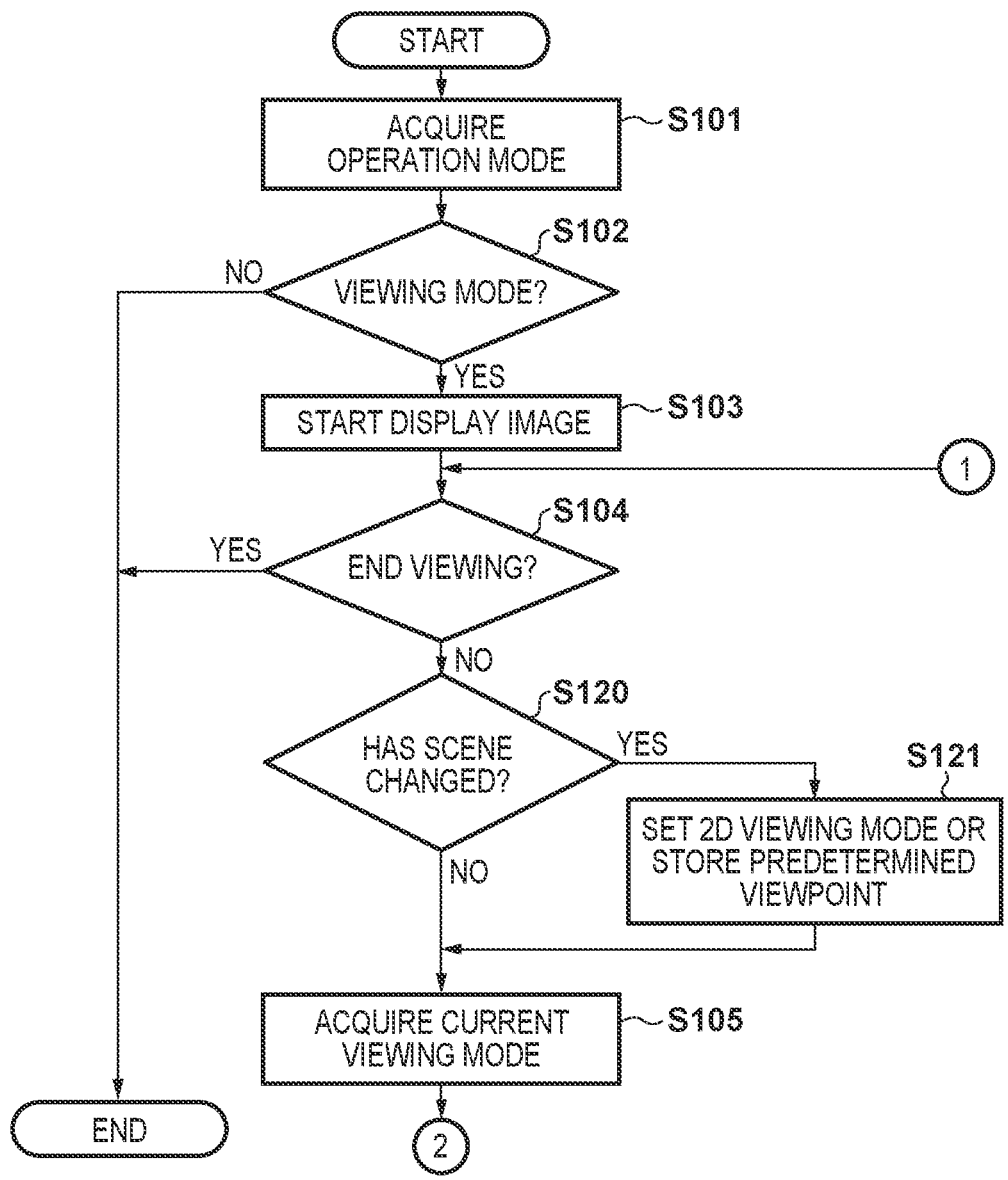

| TIME (MINUTE) | POSITION OF RF TAG |
|---|---|
| 0:00 | x1, y1, z1 |
| 1:00 | x1, y1, z1 |
| 2:00 | x1, y1, z1 |
| ⋮ | ⋮ |
| 7:00 | x2, y2, z1 |
| ⋮ | ⋮ |
| 10:00 | x3, y2, z1 |

| COORDINATES | PAN ANGLE | TILT ANGLE |
|---|---|---|
| x < x1, *, * | θ1 < θp < θ3 | * |
| x > x2, *, * | θp < θ1, θ3 < θp | * |
| *, y < y1, * | θ0 < θp < θ2 | * |
| *, y < y2, * | θ1 < θp < θ3 | * |
| *, *, z < z1 | * | * |
| *, *, z < z2 | * | θ4 < θt < θ5 |

INFORMATION PROCESSING APPARATUS AND METHOD, AND STORAGE MEDIUM FOR GENERATING ARBITRARY VIEWPOINT IMAGES

BACKGROUND OF THE INVENTION

Field of the Invention

The present invention relates to an information processing apparatus and method, and a storage medium, and particularly relates to a technique for generating a free viewpoint image from image data obtained by shooting.

Description of the Related Art

In recent years, an environment in which free-viewpoint images viewed from arbitrary viewpoints are reproduced based on multi-viewpoint image data obtained by simultaneously capturing images using a plurality of image capturing apparatuses placed at different positions has been developed. In the future, in addition to conventional single-viewpoint images shot at one shooting point, it is expected that multi-viewpoint images will be distributed as packaged content via terrestrial television broadcasting, discs, or subscription-type video distribution.

It is also assumed that the user views content while switching between single-viewpoint images and free-viewpoint images.

Japanese Patent Laid-Open No. 2010-268048 discloses that when displaying a slide show of a plurality of pre-captured still images containing a mixture of 2D (plane) and 3D (stereoscopic) images, the images are automatically converted to either 2D images or 3D images, and displayed. It is described that by doing so, the viewer does not have to cope with the switching between the 2D images and the 3D images, and it is possible to reduce the viewer's fatigue.

However, the 2D images and 3D images in Japanese Patent Laid-Open No. 2010-268048 are not captured at the same time, and it is not possible to generate and display an image viewed from an arbitrary viewpoint.

SUMMARY OF THE INVENTION

The present invention has been made in consideration of the above situation, and generates free-viewpoint images that are more in line with the viewer's intentions.

According to the present invention, provided is an information processing apparatus comprising one or more processors and/or circuitry which function as: an input unit that inputs first image data used to display an image in a first mode and second image data used to display an image in a second mode; a switching unit that switches between the first mode and the second mode; a generation unit that generates an image viewed from an arbitrary viewpoint based on the second image data; a designation unit that designates a viewpoint of an image to be generated by the generation unit; and a storage unit that stores the viewpoint of the image generated by the generation unit, wherein the first image data and the second image data are image data obtained by shooting a same subject in parallel with a plurality of image capturing apparatuses, and wherein if a viewpoint is stored in the storage unit in a case where the first mode is switched to the second mode, the designation unit designates the viewpoint stored in the storage unit.

Further, according to the present invention, provided is an information processing method comprising: inputting first image data used to display an image in a first mode and second image data used to display an image in a second mode; switching between the first mode and the second mode; designating a viewpoint of an image to be displayed in the second mode; generating an image viewed from the designated viewpoint based on the second image data in the second mode; storing the viewpoint of the generated image in a storage unit, wherein the first image data and the second image data are image data obtained by shooting a same subject in parallel with a plurality of image capturing apparatuses, and wherein if a viewpoint is stored in the storage unit in a case where the first mode is switched to the second mode, the viewpoint stored in the storage unit is designated.

Furthermore, according to the present invention, provided is a non-transitory computer-readable storage medium, the storage medium storing a program that is executable by the computer, wherein the program includes program code for causing the computer to function as an information processing apparatus comprising: an input unit that inputs first image data used to display an image in a first mode and second image data used to display an image in a second mode; a switching unit that switches between the first mode and the second mode; a generation unit that generates an image viewed from an arbitrary viewpoint based on the second image data; a designation unit that designates a viewpoint of an image to be generated by the generation unit; and a storage unit that stores the viewpoint of the image generated by the generation unit, wherein the first image data and the second image data are image data obtained by shooting a same subject in parallel with a plurality of image capturing apparatuses, and wherein if a viewpoint is stored in the storage unit in a case where the first mode is switched to the second mode, the designation unit designates the viewpoint stored in the storage unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a block diagram illustrating a functional configuration of a server apparatus according to the embodiment.

FIG. 4 is a conceptual diagram illustrating an overall configuration of a viewing system according to the embodiment.

FIG. 5 is a block diagram illustrating a functional configuration of an information processing apparatus in the viewing system according to a first embodiment.

FIGS. 8A and 8B illustrate a flowchart of viewing processing according to a modification of the first embodiment.

DESCRIPTION OF THE EMBODIMENTS

Figure 1:
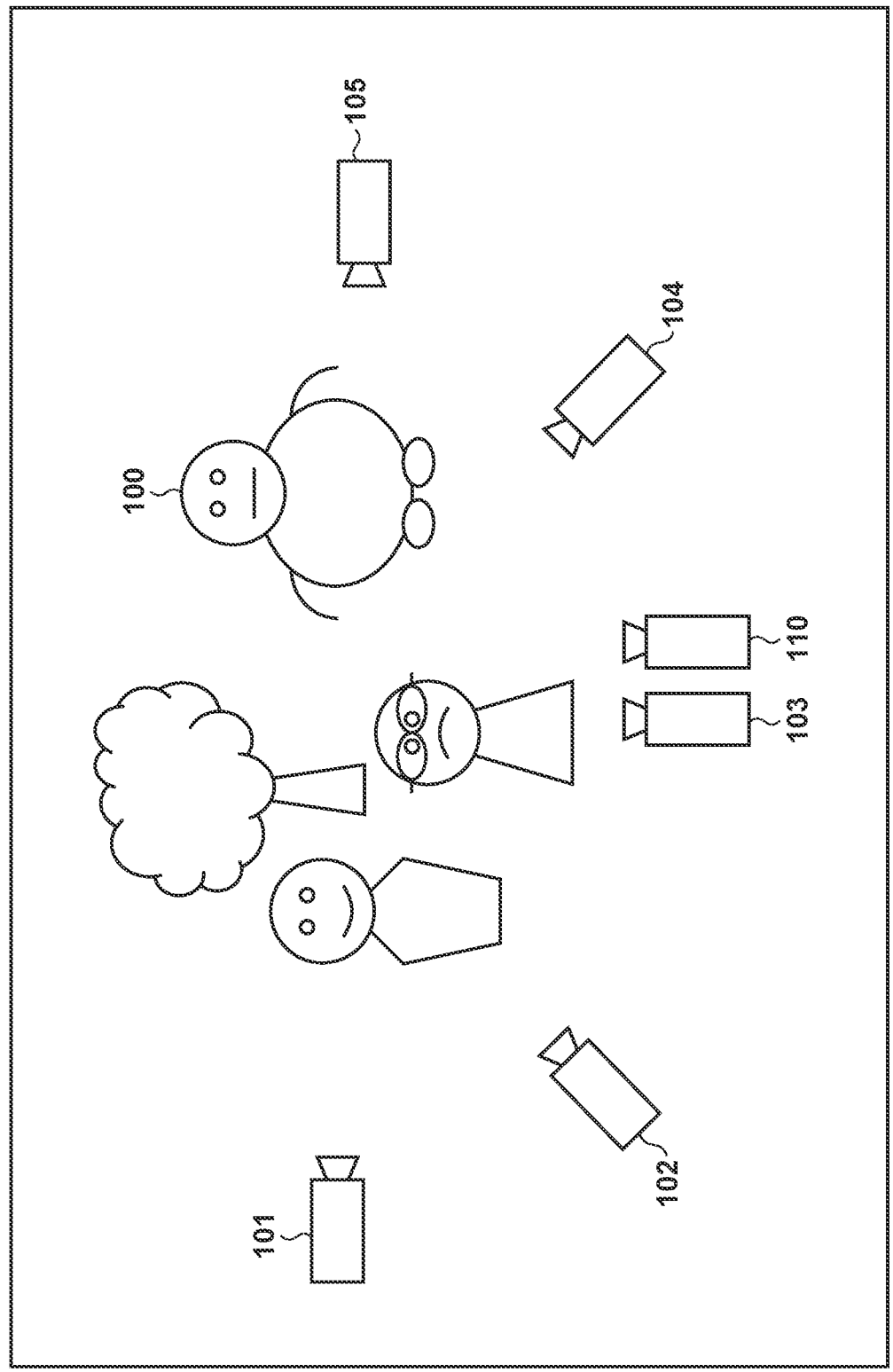
FIG. 1 is a diagram illustrating an example of the arrangement of image capturing apparatuses according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a diagram illustrating an example of the arrangement of image capturing apparatuses that constitute an image capturing system for capturing images according to the embodiment. The image capturing apparatuses include camera apparatuses 101 to 105 that shoot a subject 100 from a plurality of predetermined positions, and a camera apparatus 110 that allows a camera operator to shoot the subject 100 from an arbitrary position. Although five camera apparatuses 101 to 105 are shown in FIG. 1, the number and positions of the camera apparatuses are not limited to this, and camera apparatuses may be arranged arbitrarily as long as 3D spatial data can be generated.

Further, as for the predetermined positions, by defining the position and orientation of any one of the camera apparatuses 101 to 105 as a reference, the position of the other camera apparatuses can be defined based on the reference. Note that the reference position and orientation are not limited to these, and any position and orientation may be set as the reference as long as the relative positions and shooting directions of the camera apparatuses 101 to 105 can be specified.

Figure 2A:
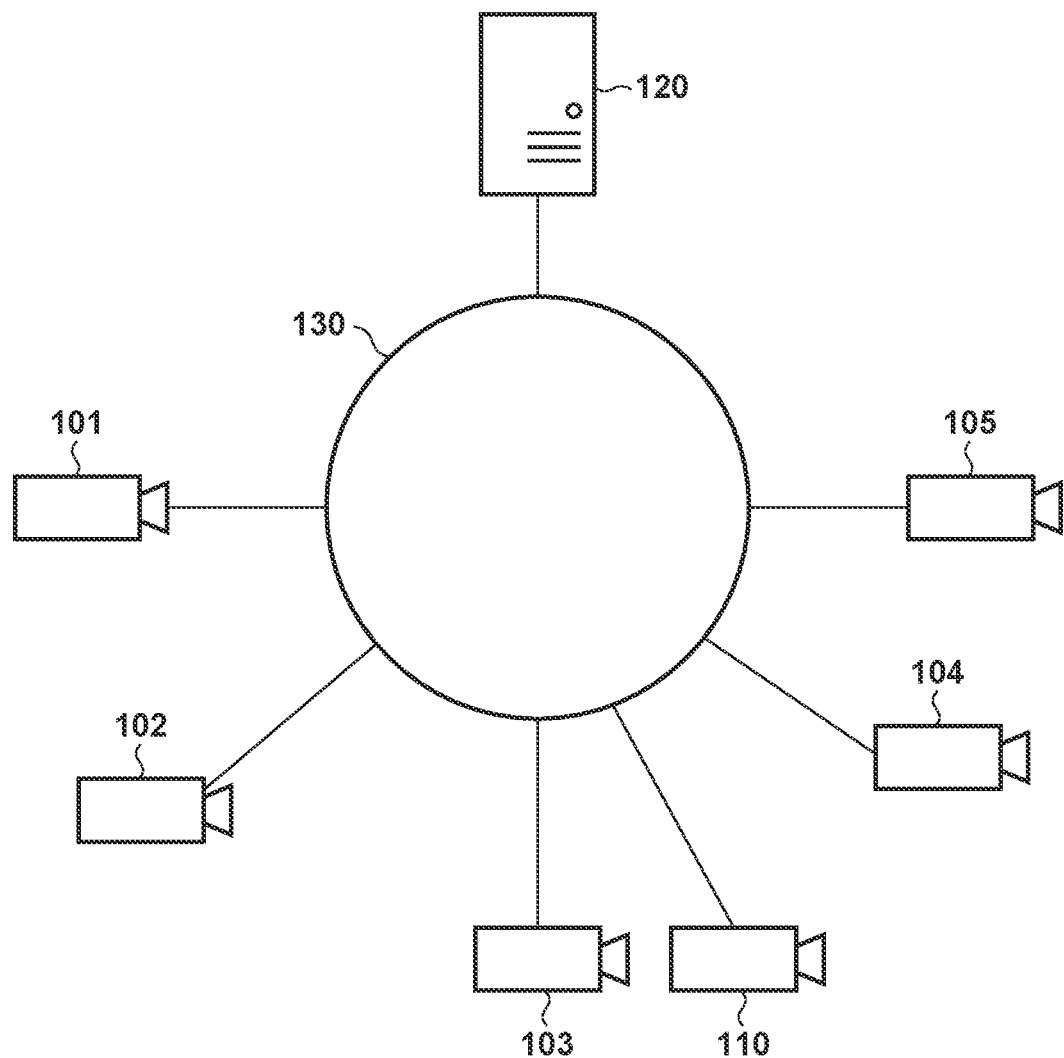
FIG. 2A illustrates a configuration example of an image capturing system according to the embodiment.
Figure 2B:
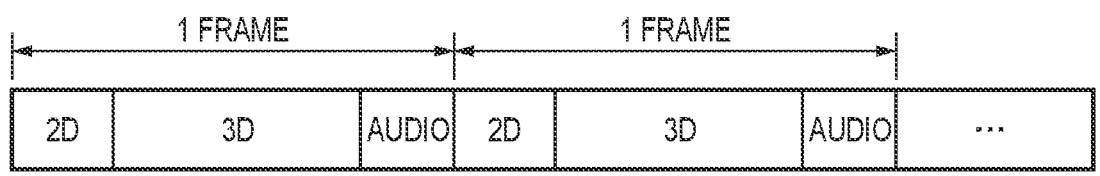
FIG. 2B is a diagram illustrating an arrangement format example of image data.

FIG. 2A is a schematic diagram illustrating a configuration example of an image capturing system according to an embodiment of the present invention, and FIG. 2B is a schematic diagram illustrating a configuration example of image data.

As shown in FIG. 2A, the image capturing system has a configuration in which the camera apparatuses 101 to 105 and the camera apparatus 110 are connected to a server apparatus 120 via a network 130 such as a wired or wireless LAN. The camera apparatuses 101 to 105 and the camera apparatus 110 have a function of capturing images and a function of collecting sound, and perform shooting and collecting sound on a subject to be shot from a plurality of predetermined position, and output image data and audio data thus obtained to the server apparatus 120 via the network 130.

The server apparatus 120 acquires viewpoint information such as the positions and orientations of the camera apparatuses 101 to 105 in advance, and reconfigures image data obtained by shooting the same subject in parallel by the camera apparatuses 101 to 105 using the viewpoint information of the camera apparatuses 101 to 105 into three-dimensional data (hereinafter referred to as "3D spatial data") of the subject existing in the image space. This 3D spatial data can be used to generate image data of a two-dimensional image viewed from an arbitrary viewpoint or image data of an image in cyber space. Note, in the following explanation, when the word "viewpoint" is simply written, it indicates both the position and direction of the viewpoint, and in order to specifically indicate either one, "position of the viewpoint" and "direction of the viewpoint" will be used.

FIG. 2B is a diagram showing an example of the data structure of each frame, and includes two-dimensional image data (hereinafter referred to as "2D image data") captured by the camera apparatus 110, the above-mentioned 3D spatial data, and audio data. The data of each frame having the above data structure is referred to as "image data with audio" hereinafter.

FIG. 3 is a block diagram illustrating the configuration of the server apparatus 120.

In the server apparatus 120, a communication unit 124, an image processing unit 125, a recording/playback unit 126, a display unit 127, an audio processing unit 128, and an operation unit 129 are connected to a CPU 121 via a CPU bus 140 and are controlled by the CPU 121. Furthermore, the communication unit 124, the image processing unit 125, the recording/playback unit 126, the display unit 127, the audio processing unit 128, and the operation unit 129 are connected to a work memory 123 via a memory bus 141.

The CPU 121 is a processor that controls each component of the server apparatus 120. A primary storage unit 122 is composed of a ROM, a RAM, or the like, and stores processing programs including a program for distribution processing, data, and so forth, for operating the CPU 121.

The communication unit 124 is used to connect to the network 130 and a network 11 described later, and may be either wireless or wired. The communication unit 124 receives image data and audio data obtained by the camera apparatuses 101 to 105 and the camera apparatus 110 via the network 130.

The image processing unit 125 and the audio processing unit 128 perform predetermined processing on the image data and audio data input via the communication unit 124, respectively, and generate image data with audio as shown in FIG. 2B. The generated image data with audio is stored via the recording/playback unit 126 in an external storage medium such as a disk memory 12 or a card memory 13, or in a mass storage (not shown) connected to the server apparatus 120. The image data with audio stored in the mass storage can be read out via the recording/playback unit 126 as needed and distributed on the network 11 via the communication unit 124.

The display unit 127 displays images, characters, icons, etc. for a user to control the server apparatus 120, and by operating members connected to the operation unit 129 with reference to the displayed content, the user can control the server apparatus 120. For example, by using an image and audio editing application stored in the primary storage unit 122, displaying information of image data and audio data on the display unit 127, and the user operating the operating members, the image data with audio can be edited.

The work memory 123 is used to temporarily store various data input via the communication unit 124, data being processed by the image processing unit 125 and the audio processing unit 128, variables and coefficients required for processing, and so forth.

The operation unit 129 detects a user operation on an operation member such as a remote controller, a button, or a touch panel (not shown), and notifies the CPU 121 of operation information corresponding to the detected user operation. The CPU 121 performs control according to the notified operation information.

FIG. 4 is a conceptual diagram showing the overall configuration of a viewing system according to this embodiment.

An information processing apparatus 1 receives image data with audio that is distributed via the network 11 such as a WAN or LAN or recorded on various recording media such as the disk memory 12 or the card memory 13. Then, by processing the input image data with audio and outputting the image data to various display devices such as a head-mounted display 14 and a monitor-type display 15, the viewer can view the image. Furthermore, by outputting the audio data to a speaker (not shown) in synchronization with the image data, the viewer can hear the audio.

Note that in the following description, processing of image data will be explained.

First Embodiment

FIG. 5 is a block diagram showing the functional configuration of the information processing apparatus 1 in the viewing system in a first embodiment.

In the information processing apparatus 1, a storage medium I/F 202, a communication unit 203, an image processing unit 204, an audio processing unit 205, and a display unit I/F 206 are connected to a CPU 200 via a CPU bus 207 and are controlled by the CPU 200. Further, the storage medium I/F 202, the communication unit 203, the image processing unit 204, the audio processing unit 205, and the display unit I/F 206 are connected to a work memory 208 via a system bus 209. Each component of the information processing apparatus 1 transmits and receives control parameters and data via the CPU bus 207 and the system bus 209.

The CPU 200 is a processor that controls each component of the information processing apparatus 1. A primary storage unit 201 is composed of a ROM, a RAM, and the like, and stores processing programs including a program for viewing processing to be described later, data, and so forth, for operating the CPU 200.

The storage medium I/F 202 reads and writes data to and from external storage media such as the disk memory 12 and card memory 13, for example.

The communication unit 203 is used to connect to the network 11, and may be either wireless or wired.

The image processing unit 204 processes the image data acquired via the storage medium I/F 202 and the communication unit 203 according to the format of the acquired image data, user instructions from an operation unit 210, the output destination of the image data, and so forth.

The audio processing unit 205 processes the audio data acquired via the storage medium I/F 202 and the communication unit 203 according to the format of the acquired audio data, user instructions from the operation unit 210, the output destination of the audio data, and so forth. The audio data processed by the audio processing unit 205 is output to a speaker via an audio output unit (not shown).

The display unit I/F 206 is used to connect to external output devices such as the head-mounted display 14 and monitor-type display 15, and the image data processed by image processing unit 204 is output to an external display device via the display unit I/F 206. In this embodiment, the explanation will be made assuming that the information processing apparatus 1 is connected to an external output device via the display unit I/F 206, but the present invention is not limited to this, and the information processing apparatus 1 may have a display unit.

The work memory 208 temporarily stores various data input via the storage medium I/F 202 and the communication unit 203, data that is being processed by the image processing unit 204 and the audio processing unit 205, and variables and coefficients necessary for processing.

The operation unit 210 detects a user operation on an operation member such as a remote controller, a button, or a touch panel (not shown), and notifies the CPU 200 of operation information corresponding to the detected user operation. The CPU 200 performs control according to the notified operation information.

Figure 6:
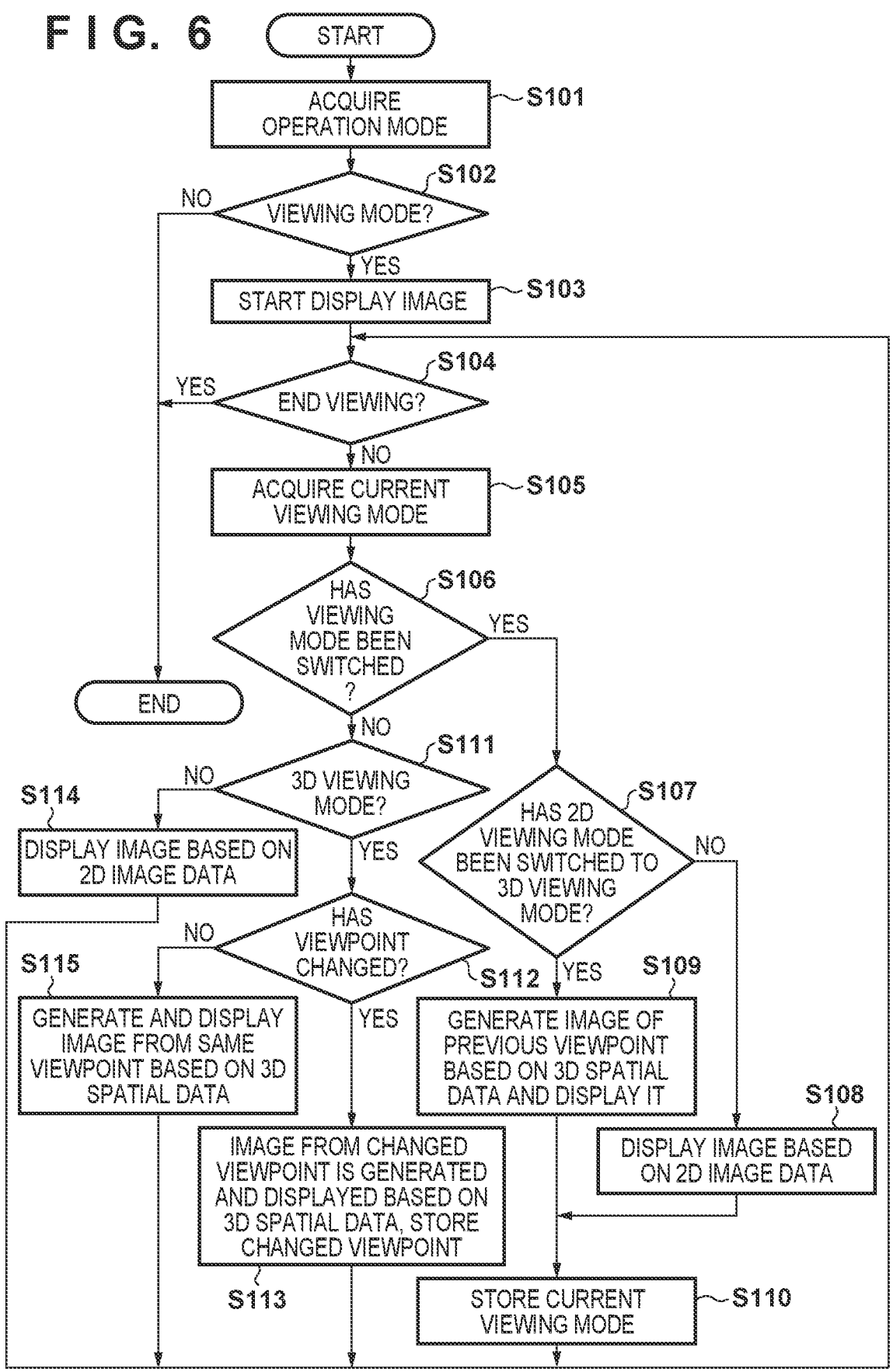
FIG. 6 is a flowchart illustrating viewing processing according to the first embodiment.

Next, viewing processing in which image data captured by the image capturing system shown in FIGS. 1 and 2A is viewed using the viewing system will be described with reference to the flowchart in FIG. 6.

First, in step S101, the CPU 200 acquires an operation mode based on the operation information notified from the operation unit 210. Then, in step S102, it is determined whether the operation mode acquired in step S101 is a viewing mode, and if it is not the viewing mode, the process ends. Note that the viewing mode in this embodiment includes an operation mode in which image data stored in an external storage medium is read and an image is displayed, and an operation mode in which image data such as streaming content input via a network is received and an image is displayed.

On the other hand, if the operation mode is the viewing mode, the process advances to step S103 and starts displaying an image of the content designated via the operation unit 210 among the viewable contents acquired via the storage medium I/F 202 or the communication unit 203. Note that at the start of display, it is assumed that a 2D viewing mode is set to display an image based on 2D image data.

Next, in step S104, the operation unit 210 determines whether or not the end of viewing the image has been instructed, and if the end of viewing has been instructed, the process ends, and if not, the process advances to step S105.

In step S105, the currently set viewing mode is acquired. Here, either the 2D viewing mode for displaying images based on 2D image data or a 3D viewing mode for displaying images based on 3D spatial data is assumed.

Then, in step S106, it is determined whether the viewing mode has been switched based on the viewing mode acquired in step S105, and if it has been switched, the process proceeds to step S107, and if it has not been switched, the process proceeds to step S111.

In step S111, it is determined whether the current viewing mode is the 3D viewing mode. If the current viewing mode is not the 3D viewing mode, that is, the current viewing mode is the 2D viewing mode, the process advances to step S114, where an image is displayed based on 2D image data, and then the process returns to step S104 to repeat the above processes.

On the other hand, if the current viewing mode is the 3D viewing mode, images based on 3D spatial data are currently displayed. In that case, in step S112, it is determined whether a change in viewpoint has been instructed. Note that here, it is determined whether a change in at least one of the position and orientation of the viewpoint has been instructed. If there is no instruction to change the viewpoint, in step S115, an image viewed from the same viewpoint as before is generated based on 3D spatial data and displayed. Then, the process returns to step S104 and the above processes are repeated.

On the other hand, if a change in the viewpoint is instructed, the process proceeds to step S113, where an image viewed from the changed viewpoint is generated based on 3D spatial data and displayed, and the changed viewpoint (position and orientation) is stored. Thereafter, the process returns to step S104 and the above processes are repeated.

Note that, as a method for changing the viewpoint, if a touch panel is mounted on the display unit on which the image is displayed, changing the viewpoint by a touch operation can be considered. For example, if the user touches the touch panel and performs a move operation in the up, down, left, and/or right direction, it is determined that an instruction to change the viewpoint in the direction of the move has been given. Further, operations may be performed using known methods, such as enlarging (zooming in) and reducing (zooming out) by pinching with multiple fingers. Alternatively, a sub-image showing the arrangement of the cameras shown in FIG. 1 may be displayed on a part of the display unit, and the user may change the viewpoint by touching a desired position. It is also possible to instruct to change the viewpoint using a controller including a cross key, slide key, joystick, and so forth.

In addition, in a case where the head-mounted display 104 is used as an output device, it may be equipped with a motion detection unit that detects the movement of the viewer's body, a line-of-sight detection unit that detects the line of sight, etc., and the viewpoint may be changed based on the information about the detected movement and line of sight of the viewer.

As described above, the viewpoint can be changed in various ways, and the present invention is not limited by the method of changing the viewpoint.

On the other hand, if it is determined in step S106 that the viewing mode has been switched, it is determined in step S107 that whether the 2D viewing mode has been switched to the 3D viewing mode. If the switching is from the 3D viewing mode to the 2D viewing mode, the process proceeds to step S108, where an image is displayed based on 2D image data, and then the process proceeds to step S110. In step S110, the current viewing mode, that is, the 2D viewing mode is stored, and then the process returns to step S104 to repeat the above processes.

If it is determined in step S107 that the 2D viewing mode has been switched to the 3D viewing mode, the process proceeds to step S109, the previous viewpoint in the 3D viewing mode stored in step S113 is read out, and the image viewed from the read viewpoint is generated based on the 3D spatial data and displayed. However, if switching to the 3D viewing mode has been made for the first time since the viewing mode is started, the previous viewpoint is not stored, so an image viewed from a predetermined viewpoint is generated and displayed. At this time, for example, by setting the viewpoint to be the same as the viewpoint of the 2D image data, it is possible to smoothly switch the images displayed at the time of switching the viewing mode. Then, in step S110, the current viewing mode, that is, the 3D viewing mode is stored, and then the process returns to step S104 to repeat the above processes.

Figure 7A:
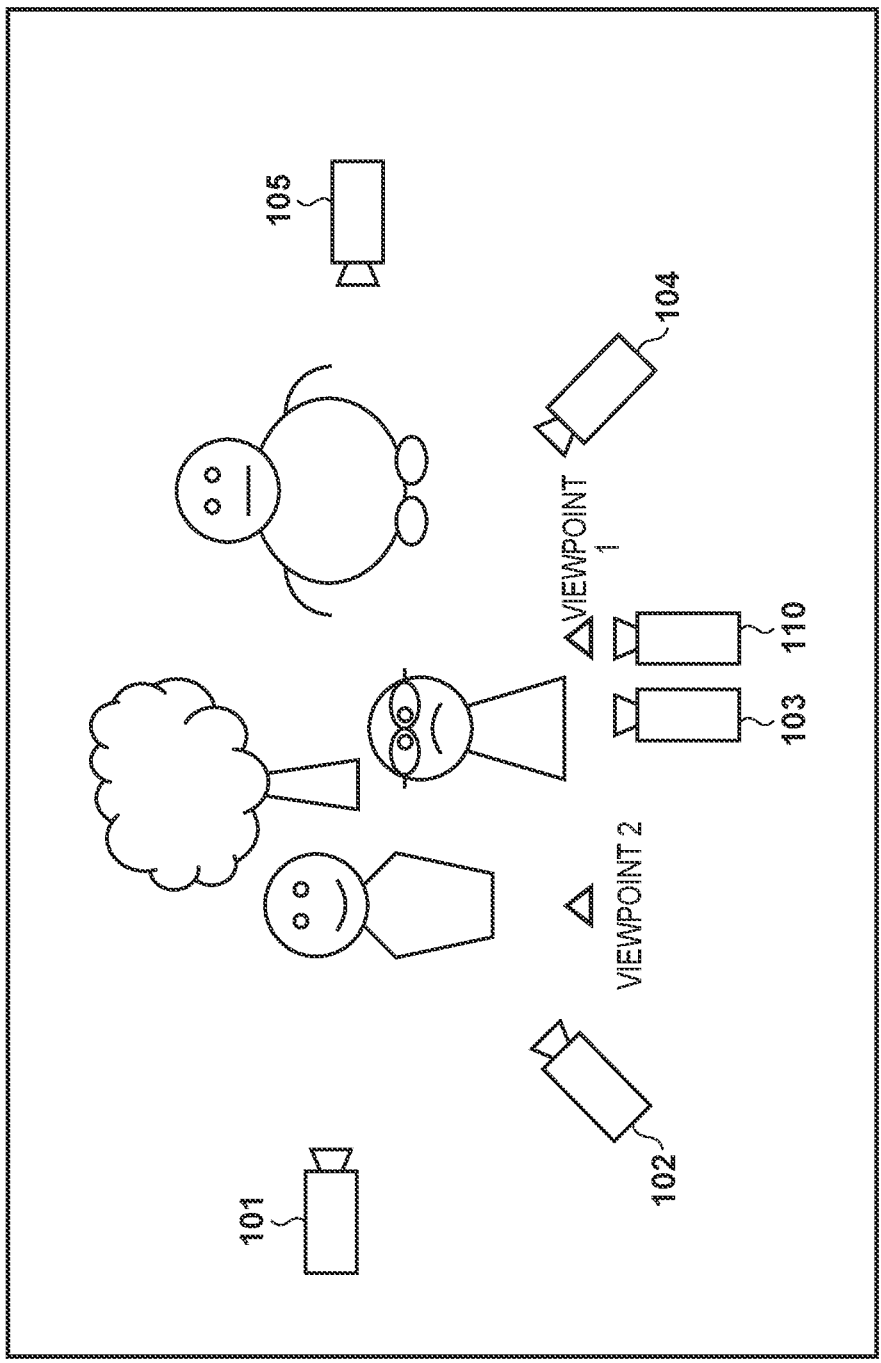
FIGS. 7A and 7B are diagrams for explaining changes in images according to the first embodiment.
Figure 7B:
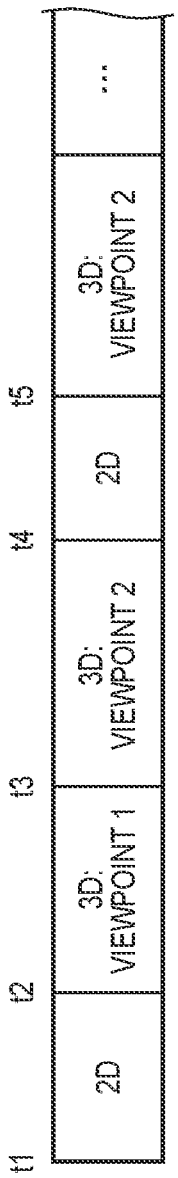

An example of a change in the viewpoint of an image displayed when the above viewing processing is performed will be described with reference to FIGS. 7A and 7B. FIG. 7A is a diagram illustrating an example of the arrangement of the camera apparatuses 101 to 105 and the camera apparatus 110 and the positions of viewpoints, and FIG. 7B is a diagram illustrating types of displayed images and viewpoints.

First, when the viewing mode is selected (YES in step S102), image display starts in the 2D viewing mode at time t1, and while the 2D viewing mode continues (NO in step S111), images are displayed based on 2D image data (step S114). Thereafter, when switching to the 3D viewing mode (YES in step S106), at time t2, an image viewed from a predetermined viewpoint 1 is generated based on 3D spatial data and displayed (step S109). Thereafter, if no instruction is given to change the viewpoint, images viewed from the viewpoint 1 is generated and displayed (step S115).

While displaying images in the 3D viewing mode, if the viewer instructs to change the viewpoint from the viewpoint 1 to a viewpoint 2 (YES in step S112), at time t3, an image viewed from the viewpoint 2 is generated and displayed, and the viewpoint 2 is stored (step S113).

Then, when the 3D viewing mode is switched to the 2D viewing mode, an image based on 2D image data is displayed at time t4 (step S108).

After that, when switching to the 3D viewing mode is performed again, at time t5, the viewpoint 2 stored in step S113 is acquired, and an image viewed from the viewpoint 2 is generated based on 3D spatial data and displayed (step S109). Thereafter, images are displayed in the same manner according to the switching of the viewing mode and the switching of the viewpoint.

As described above, according to the first embodiment, in a case where the viewing mode is switched from the 3D viewing mode to the 2D viewing mode and then to the 3D viewing mode again, it is possible to start viewing an image viewed from the viewpoint stored before switching to the 2D viewing mode.

Note that in the above example, when changing of viewpoint is instructed, it is assumed that the image viewed from the current viewpoint is immediately changed to the image viewed from the changed viewpoint, but images may be generated and displayed such that the viewpoint gradually changes over multiple frames. In that case, for example, it is conceivable to change the viewpoint in each frame by a distance which is obtained by dividing the straight line distance connecting the viewpoints before and after the change by the number of frames to be changed. However, any method may be used as long as images whose viewpoint changes smoothly can be generated.

Modification

Figure 8B:
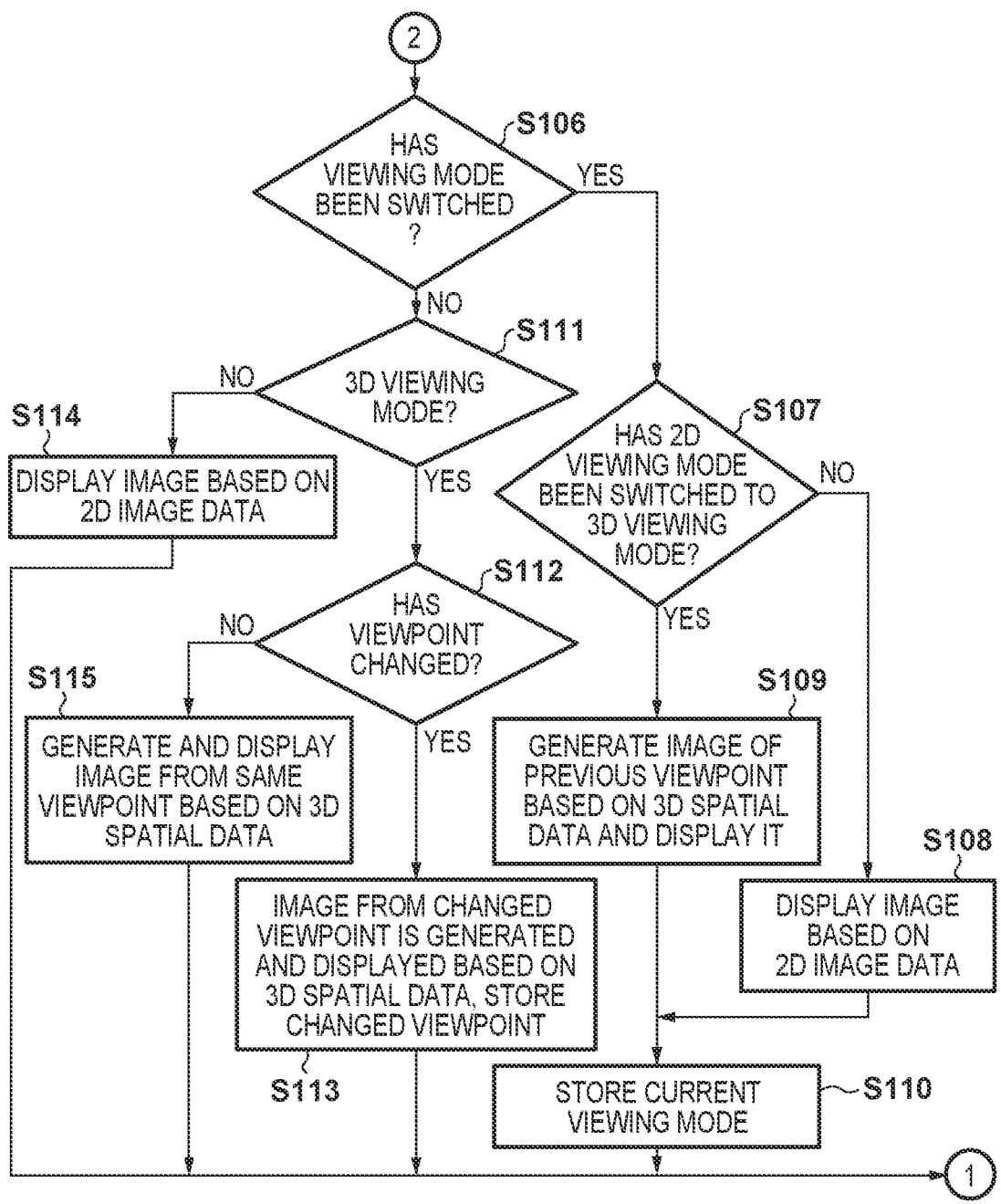

For example, when viewing content such as a soap opera by specifying an arbitrary viewpoint in the 3D viewing mode, the specified viewpoint may become meaningless when a scene changes. As this example, when the content includes a scene change, as shown in FIGS. 8A and 8B, it may be determined whether the scene has changed in step S120 before the determination in step S105. If the scene has not changed, the process directly proceeds to step S105; if the scene has changed, the process proceeds to step S121 where the 2D viewing mode is set, or a predetermined viewpoint is set and stored, and then process proceeds to step S105. In this case, the viewing mode and viewpoint may be determined in advance by a camera operator, or may be specified in advance by the viewer.

In a case where a camera operator decides the viewing mode in advance, information regarding the viewing mode and/or viewpoint specified by the camera operator may be embedded at the beginning of each scene.

By controlling the viewing mode and/or the viewpoint when the scene changes in this way, it is possible to quickly display an easy-to-see image even when the scene changes.

Second Embodiment

Next, a second embodiment of the present invention will be described.

Figure 9:
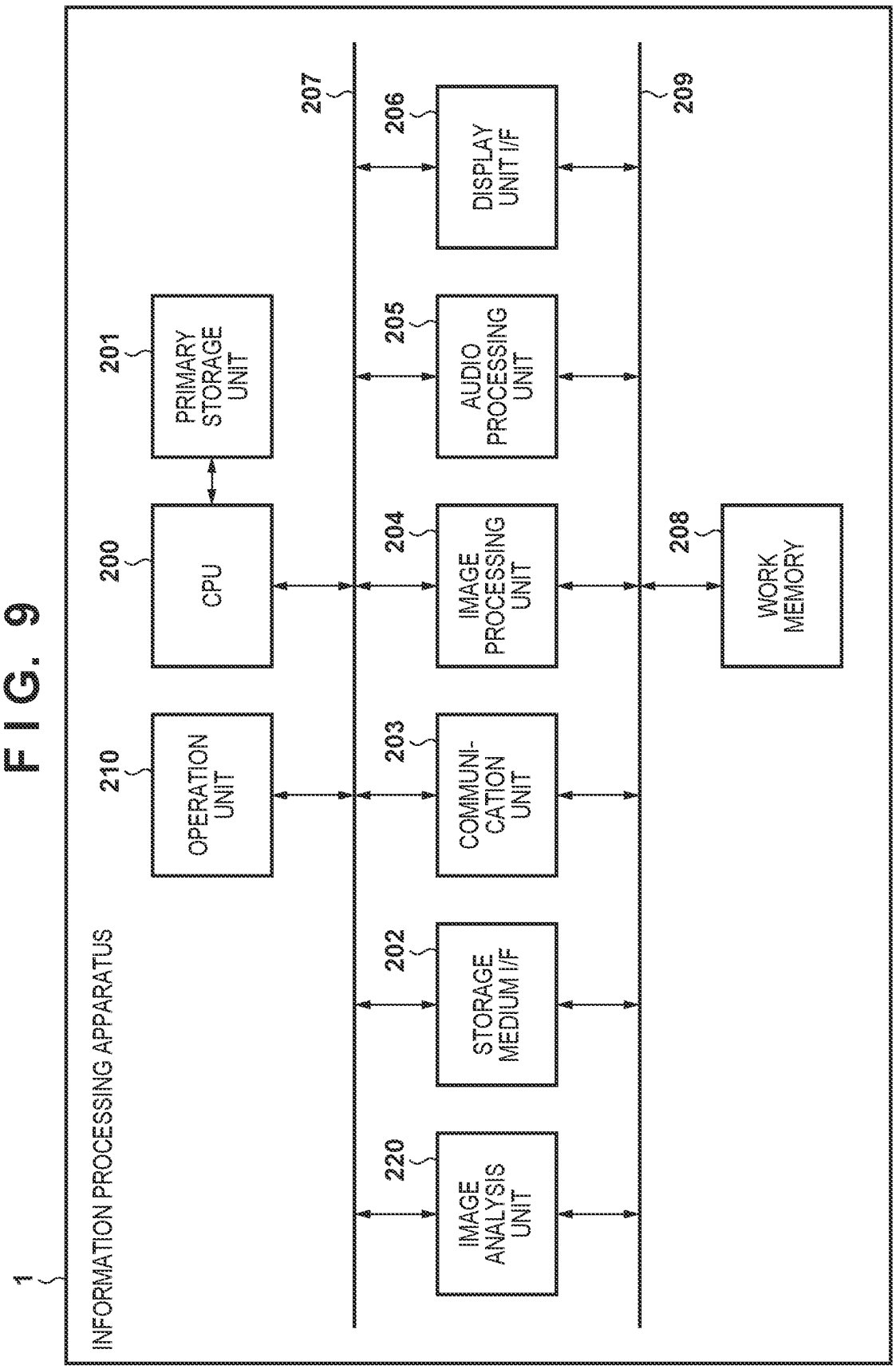
FIG. 9 is a block diagram illustrating a functional configuration of an information processing apparatus in the viewing system according to a second embodiment.

In the second embodiment, a case will be described in which a subject specified by a user is automatically tracked and displayed. FIG. 9 is a block diagram showing the configuration of the information processing apparatus 1 in the second embodiment. The information processing apparatus 1 differs from the information processing apparatus 1 described with reference to FIG. 5 in the first embodiment in that it further includes an image analysis unit 220 for detecting a subject. The configurations other than the image analysis unit 220 are the same as those in FIG. 2A, so the same reference numerals are given and the description thereof will be omitted.

The image analysis unit 220 analyzes image data acquired via the storage medium I/F 202 and the communication unit 203, and detects a predetermined subject. Note that various methods have been proposed as techniques for detecting subjects, and any method may be used as long as the position and size information of the subject can be obtained, and the present invention is not limited by the subject detection method. For example, methods using machine learning, such as neural networks, and methods that extract parts of a subject with physically characteristic shape from image regions by template matching are known. Other methods include detecting an amount of characteristic feature of the subject image, such as color and shape, and analyzing them using statistical methods (for example, Japanese Patent Laid-Open Nos. 10-232934 and 2000-48184).

When the user specifies a tracking mode and a subject to be tracked using the operation unit 210, the image analysis unit 220 analyzes the 3D spatial data and detects the specified subject. Based on the detection results of the image analysis unit 220, the image processing unit 204 sets the position of the camera apparatus closest to the detected subject among the camera apparatuses 101 to 105 as a tracking viewpoint, and an image viewed from the tracking viewpoint is generated such that the subject is placed at a predetermined position in the image (for example, near the center) and displayed via the display unit I/F 206. Then, each time 3D spatial data is input, a process to detect the specified subject in the image viewed from the tracking viewpoint is performed, and an image is generated while changing the direction of the tracking viewpoint so that the detected subject is placed at a predetermined position such as the center of the image, and displayed.

Figure 10A:
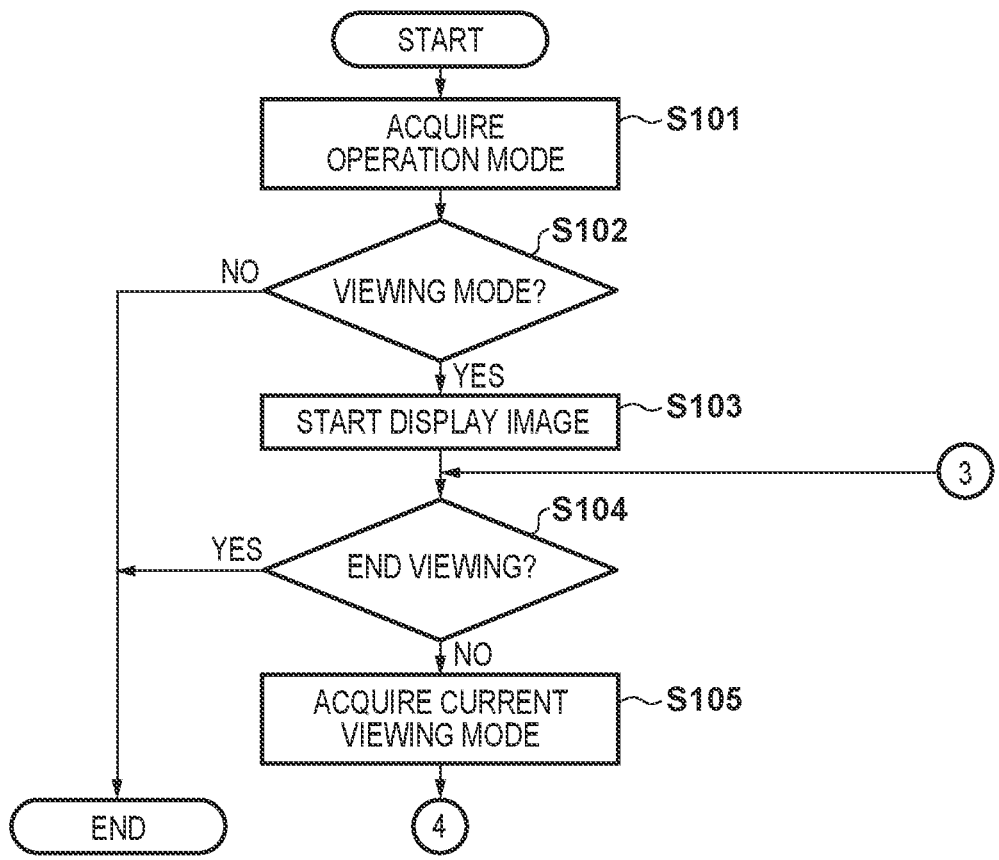
FIGS. 10A and 10B illustrate a flowchart of viewing processing according to the second embodiment.
Figure 10B:
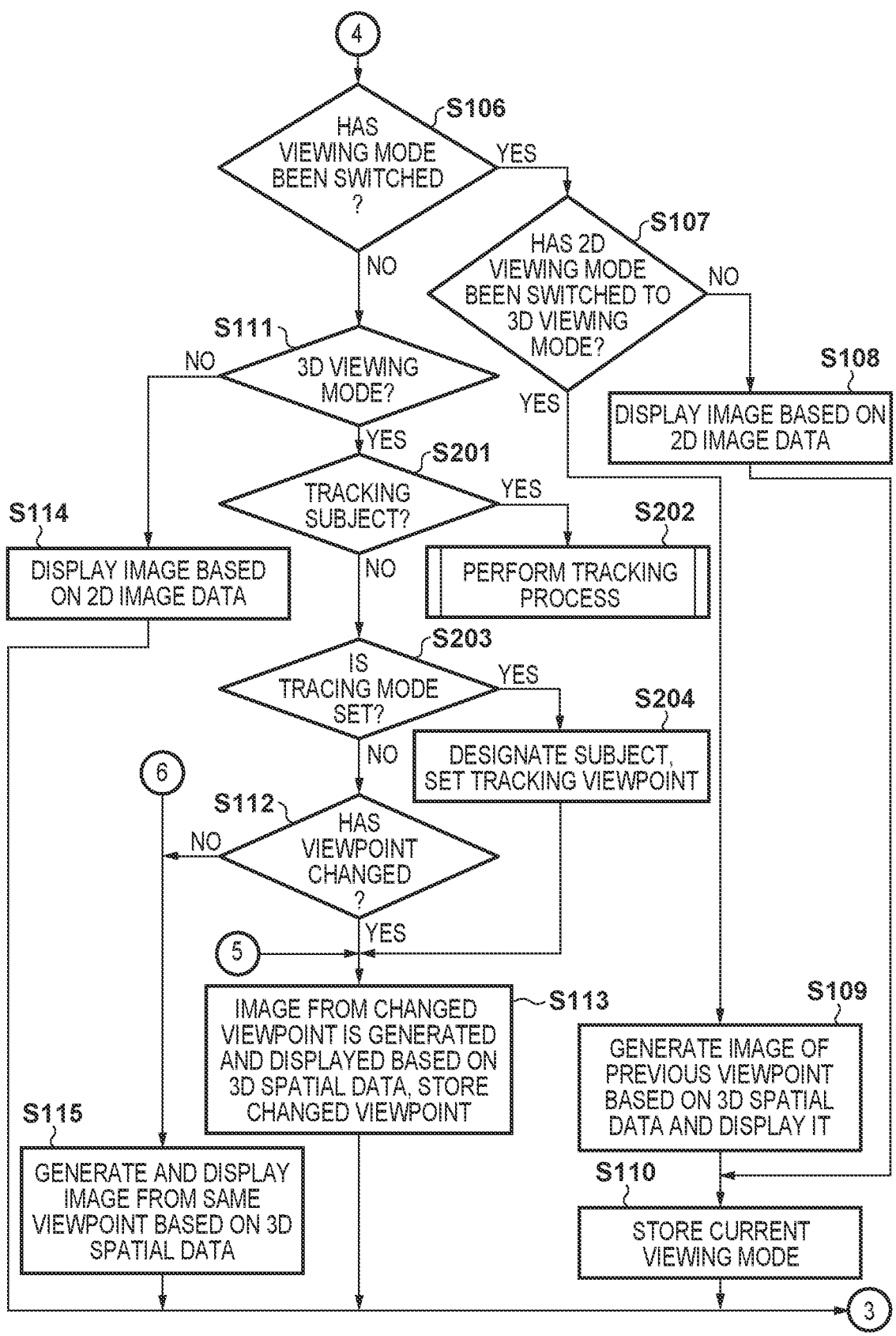

Hereinafter, a viewing processing in which image data captured by the image capturing system shown in FIG. 1 is viewed by the information processing apparatus 1 shown in FIG. 9 will be described with reference to the flowchart shown in FIGS. 10A and 10B. Note that the processing shown in FIGS. 10A and 10B differs from the processing shown in FIG. 6 described in the first embodiment in that processes of steps S201 to S204 are added. Since the processes other than these are the same as those shown in FIG. 6, the same step numbers are given to the same processes and explanation thereof will be omitted.

If it is determined in step S111 that the camera is in the 3D viewing mode, the process advances to step S201, and it is determined whether the subject is being tracked. If the subject is being tracked, in step S202, a subject tracking process is performed. Note that the tracking process in step S202 will be described later with reference to FIG. 11.

On the other hand, if the subject is not being tracked, the process advances to step S203, and it is determined whether the tracking mode for tracking the subject has been selected by the operation unit 210. If the tracking mode is not selected, the process advances to step S112, and if the tracking mode is selected, the process advances to step S204.

In step S204, the designation of the subject to be tracked by the viewer's operation via the operation unit 210 is accepted, and the position of the camera apparatus closest to the position of the designated subject among the camera apparatuses 101 to 105 is set as the position of the tracking viewpoint. Furthermore, the direction of the tracking viewpoint is determined so that the designated subject is placed at a predetermined position in the image, and the tracking viewpoint is stored. Then, the image analysis unit 220 detects and stores the feature amount of the subject to be tracked, and the process proceeds to step S113.

Next, the subject tracking process performed in step S202 will be described with reference to FIG. 11.

If the subject is being tracked, in step S210, the image analysis unit 220 performs subject detection process based on the feature amount of the subject stored in step S204. If it is determined in step S211 that the subject has been detected, the process proceeds to step S212, where the tracking viewpoint is changed so that the detected subject is displayed at a predetermined position in the image viewed from the tracking viewpoint, and the process proceeds to step S113. In step S113, the image processing unit 204 generates and displays an image viewed from the changed tracking viewpoint, and stores the changed tracking viewpoint.

On the other hand, if it is determined in step S211 that the subject has not been detected, the CPU 200 determines in step S213 whether the elapsed time for which the subject has not been detected is equal to or less than a threshold Th1. If yes, the process proceeds to step S115 without changing the tracking viewpoint, and the image processing unit 204 generates and displays an image viewed from the same tracking viewpoint as before. In this way, by comparing the elapsed time for which the subject has not been detected with the threshold value Th1, it is possible to continue to track a subject even if the subject has not been detected for a short period of time for some reason, such as when the subject closes his/her eyes or looks sideways.

In step S213, if the CPU 200 determines that the elapsed time for which the subject has not been detected exceeds the threshold Th1, it is assumed that detection of the subject has failed, and the tracking mode is canceled in step S214, and the process proceeds to step S115.

As described above, according to the second embodiment, in addition to the same effects as the first embodiment, it is possible to view an image in which an arbitrary subject is automatically tracked.

Note that in the example described above, an image in which the subject is tracked is generated by changing the direction of the tracking viewpoint without changing the position of the tracking viewpoint, however, the position of the tracking viewpoint may be changed. For example, when the subject is moving, the moving direction and moving speed may be determined, and the tracking viewpoint may be moved so as to move in the determined moving direction at the determined moving speed.

In addition, in a case where the size of the subject that occupies the screen becomes smaller than a predetermined threshold, the position of the tracking viewpoint may be moved in the direction closer to the subject until the size of the subject reaches the predetermined threshold without changing the direction of the tracking viewpoint.

Further, in the above example, the case where the tracking mode is selected during the 3D viewing mode has been described, but the tracking mode may be selected during the 2D viewing mode. In that case, the viewing mode is switched to the 3D viewing mode and then the subject may be designated.

Furthermore, in the above example, in a case where the tracking mode is selected and a subject is designated, the position of the camera apparatus that is closest to the designated subject among the camera apparatuses 101 to 105 is set as the position of the tracking viewpoint, however, the present invention is not limited to this. For example, the position of the viewpoint when the subject is designated may be set as the tracking viewpoint, and thus, the position of the viewpoint may be set as appropriate.

Furthermore, in the above example, the tracking mode is canceled when the predetermined time Th1 for which the subject has not been detected has elapsed, and an image of the viewpoint at the time of cancellation is generated and displayed, however, the present invention is not limited to this. For example, the viewpoint may be changed to a predetermined viewpoint or switched to the 2D viewing mode.

Further, in the above example, a case where the viewer designates the subject to be tracked is explained, however, the present invention is not limited to this, and the subject to be tracked may be set automatically. For example, audio data may be used and a viewpoint with the highest level of audio data may be set as the tracking viewpoint.

Modification

For example, when viewing content such as a soap opera, the subject may be lost due to a scene change. In this way, in a case where the content includes a scene change, it may be determined whether the scene has changed before the determination in step S105. If the scene has not changed, the process directly advances to step S105; if the scene has changed, the viewing mode changes to the 2D viewing mode or a predetermined viewpoint is set and stored, and then the process proceeds to step S105. In this case, the viewing mode and viewpoint may be determined in advance by the camera operator, or may be specified in advance by the viewer. This process can be realized by adding steps S120 and S121 in FIG. 8A to the processing shown in FIG. 10A.

If the camera operator decides the viewing mode and/or viewpoint in advance, information regarding the viewing mode and/or viewpoint designated by the camera operator may be embedded at the beginning of each scene.

By controlling the viewpoint in this manner, it is possible to quickly display an easy-to-see image even in a case where it is assumed that the scene changes and the subject becomes undetectable.

Third Embodiment

Next, a third embodiment of the present invention will be described.

In the second embodiment described above, a case has been described in which a subject is specified and tracked in the viewing system. In contrast, in the third embodiment, a case will be described in which a subject is tracked in an image capturing system. Note that the configuration of the information processing apparatus 1 in the viewing system in the third embodiment is the same as that shown in FIG. 5 or FIG. 9, so the description thereof will be omitted here.

First, a transmitting device that transmits radio waves, such as an RF tag, is attached to the main subject among the subjects 100 shown in FIG. 1, and receiving devices that receive the radio waves are installed at the respective position of the camera apparatuses 101 to 105. Then, the server apparatus 120 determines the position of the main subject on the same coordinate axes as the camera apparatuses 101 to 105 based on the strength of the radio waves obtained by the plurality of receiving devices, and stores the position of the main subject with respect to time. Tracking data (tracking information) indicating the time and the position of the main subject thus obtained is distributed or recorded together with the image data with audio.

Figures 11, 12:
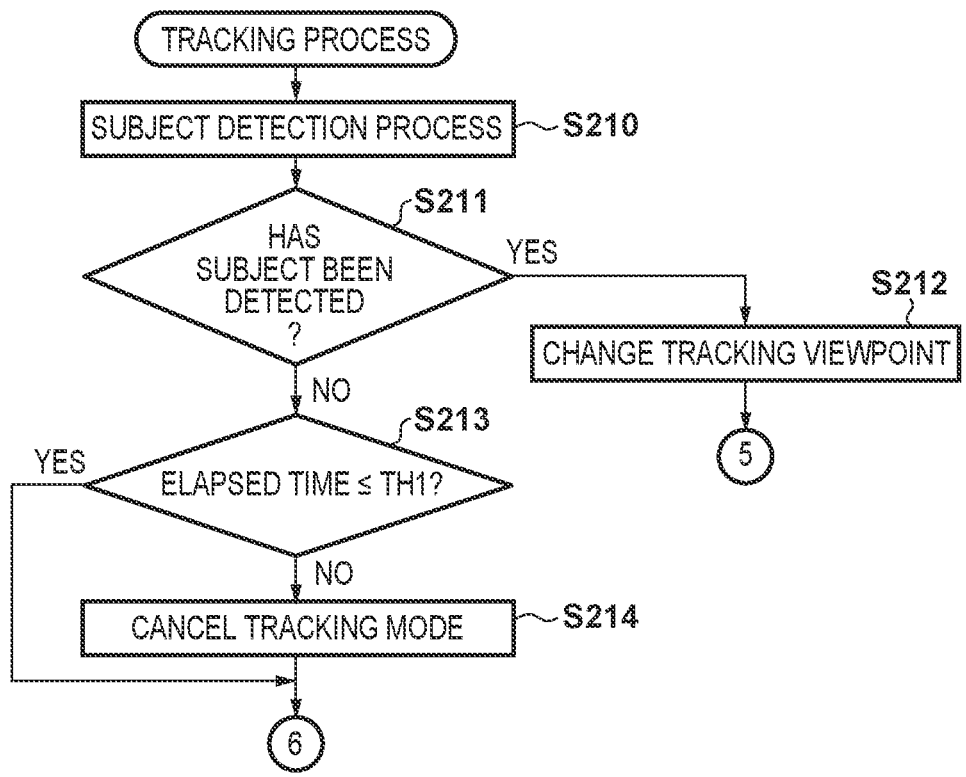
FIG. 11 is a flowchart illustrating a subject tracking process according to the second embodiment.
FIG. 12 is a diagram illustrating an example of tracking data according to a third embodiment.

FIG. 12 is a diagram showing an example of the tracking data in the third embodiment. The positions of the main subject obtained at predetermined time intervals are sequentially stored. In this example, the main subject's position moves to (x1, y1, z1) during a period from 0 to 7:00 (minutes), moves to (x2, y2, z1) after 7:00 minutes, and then moves to (x3, y2, z1) after 10:00 minutes.

Figure 13A:
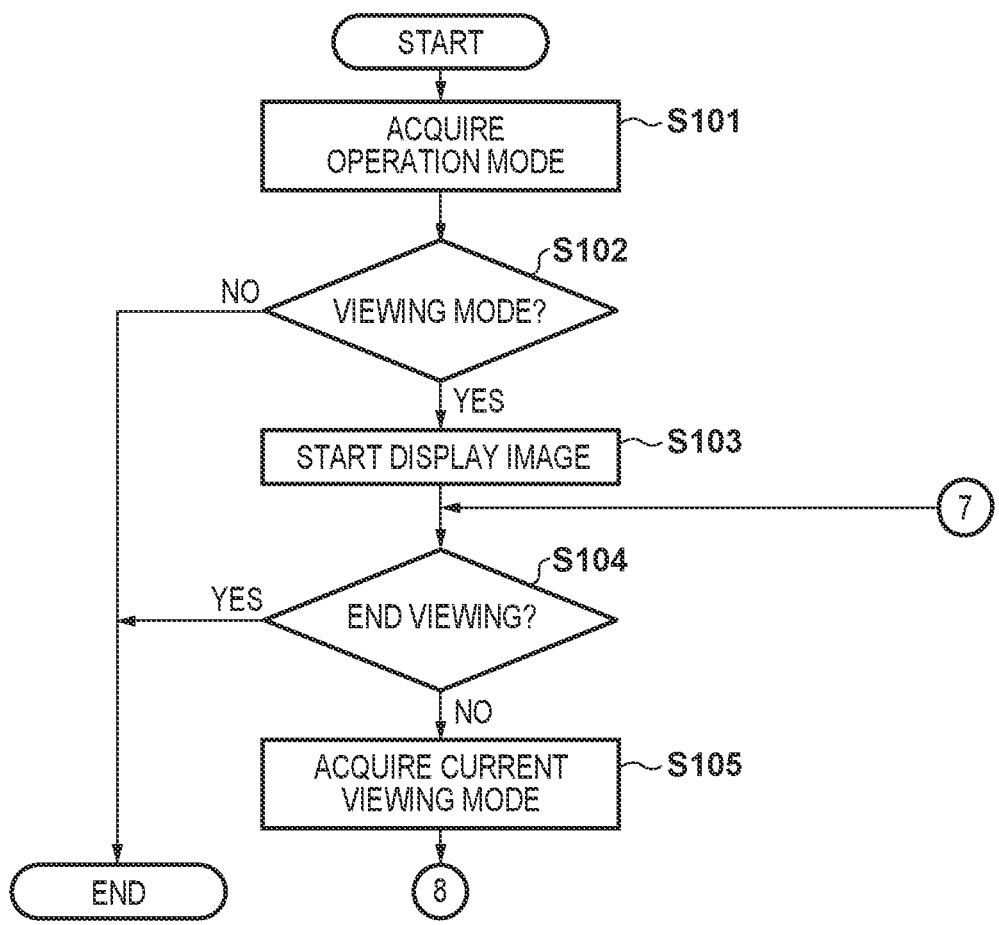
FIGS. 13A and 13B illustrate a flowchart of viewing processing according to the third embodiment.
Figure 13B:
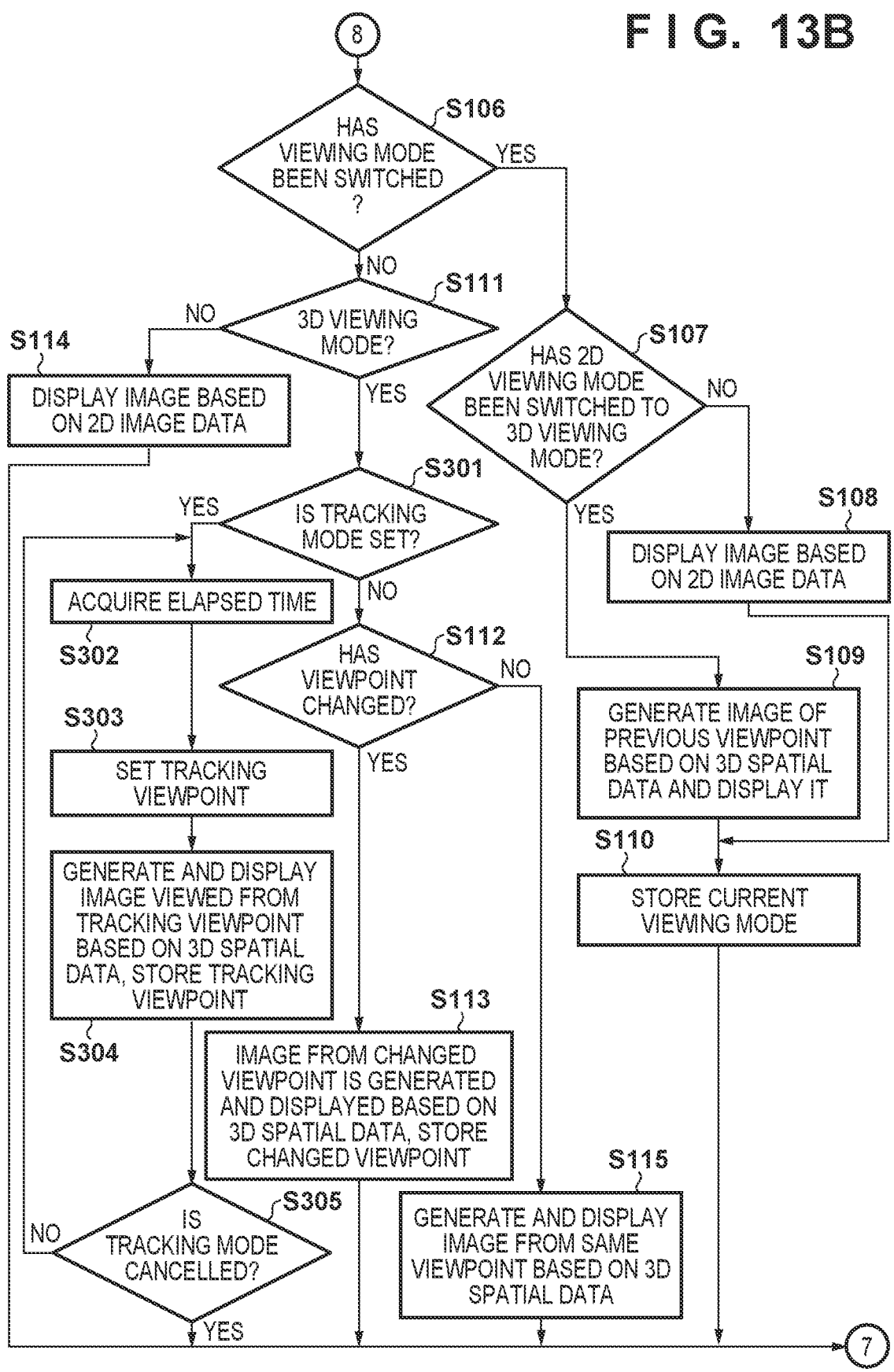

FIGS. 13A and 13B illustrate a flowchart of viewing processing in the third embodiment. Note that the processing shown in FIGS. 13A and 13B is that the processes of steps S301 to S305 are added to the processing of the flowchart shown in FIG. 6, and the processes other than steps S301 to S305 are the same as the processes of FIG. 6, so the same step numbers are given and the explanation thereof will be omitted.

If it is determined in step S111 that the viewing mode is the 3D viewing mode, the process proceeds to step S301, in which whether a tracking mode for tracking a subject is selected by the operation unit 210 is determined. If the tracking mode is not selected, the process advances to step S112, and if the tracking mode is selected, the process advances to step S302.

In step S302, the elapsed time of the currently viewed image is acquired, and in step S303, the position of the main subject recorded in the tracking data is acquired based on the acquired elapsed time. Then, among the camera apparatuses 101 to 105, the camera apparatus located closest to the acquired position of the main subject is set as the position of the tracking viewpoint. Next, in step S304, an image is generated and displayed using 3D spatial data so that the main subject is located at a predetermined position (for example, the center) on the screen based on the set tracking position, and the tracking viewpoint is stored. Then, in step S305, it is determined whether the tracking mode is canceled. If the tracking mode is not canceled, the process returns to step S302 and the above processes are repeated; if it is canceled, the process returns to step S104.

As described above, according to the third embodiment, it is possible to easily display an image in which the main subject set by the camera operator is tracked among the subjects 100.

Note that in the above example, only the position of the main subject is tracked during shooting, but the number of subjects to be tracked is not limited to one. A plurality of transmitting devices with different IDs may be mounted on a plurality of subjects, and data on position information with respect to time may be generated for each subject. In that case, the viewer can select an arbitrary subject and an image that follows the selected subject can be displayed.

Fourth Embodiment

Next, a fourth embodiment of the present invention will be described.

The images obtained by the plurality of camera apparatuses 101 to 105 may include images of areas such as the wings of the stage that the camera operator does not want to show. Therefore, in the fourth embodiment, a process that a distributor limits the viewpoints of viewers will be described. Note that the configuration of the information processing apparatus 1 in the viewing system in the fourth embodiment is the same as that shown in FIG. 5 or FIG. 9, so a description thereof will be omitted here.

In the fourth embodiment, invalid viewpoint data in which combinations of positions and orientations of viewpoints that the camera operator wants to prohibit image generation is generated, and the generated invalid viewpoint data is distributed or recorded together with image data with audio.

Figures 14, 15A:
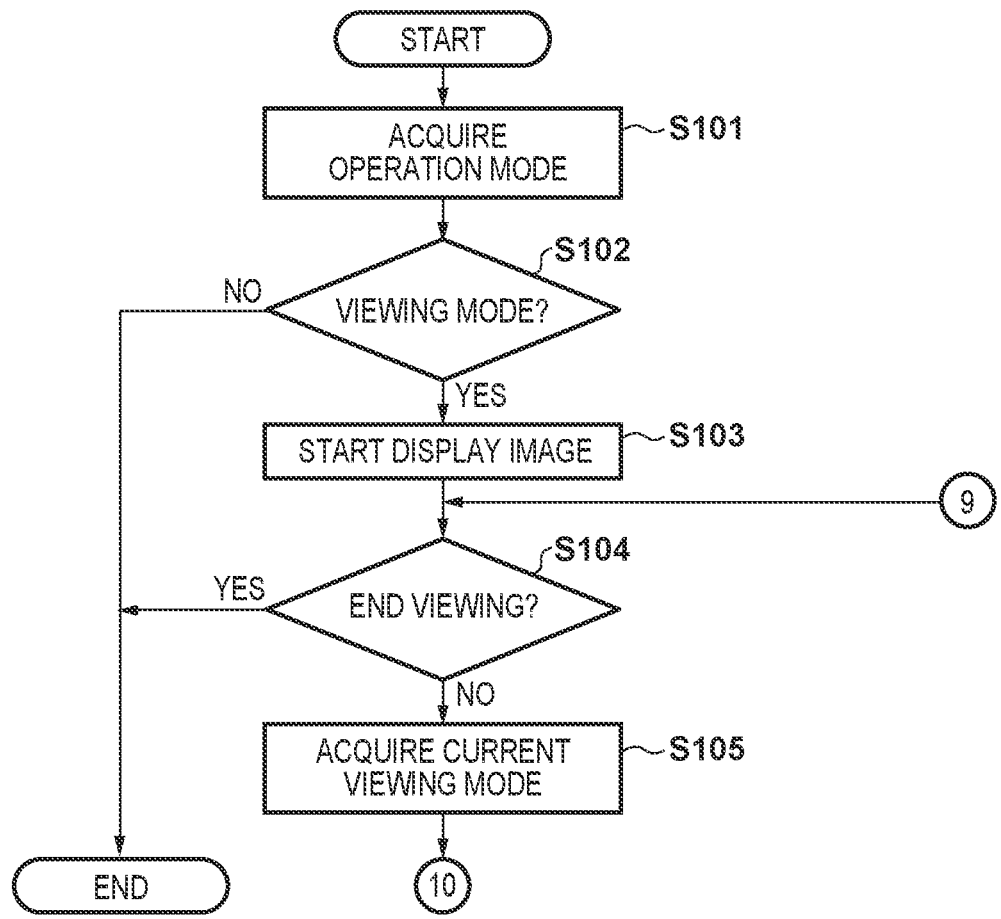
FIG. 14 is a diagram illustrating an example of invalid viewpoint data according to a fourth embodiment.
FIGS. 15A and 15B illustrate a flowchart of viewing processing according to the fourth embodiment.

FIG. 14 is a diagram illustrating an example of invalid viewpoint data in the fourth embodiment. Information on the positions (coordinates) and directions (pan angle θp, tilt angle θt) of the viewpoints to be invalidated is stored. Note that in FIG. 14, values that are not included in the invalidation conditions are represented by *. This invalid viewpoint data is generated by, for example, displaying a three-dimensional map of the area shot by the camera apparatuses 101 to 105 on the display unit 127 of the server apparatus 120, and selecting the viewpoints that the camera operator wants to invalidate using the operation unit 129 and converting the selected viewpoints into the coordinates and angles of the viewpoints by the CPU 121.

Figure 15B:
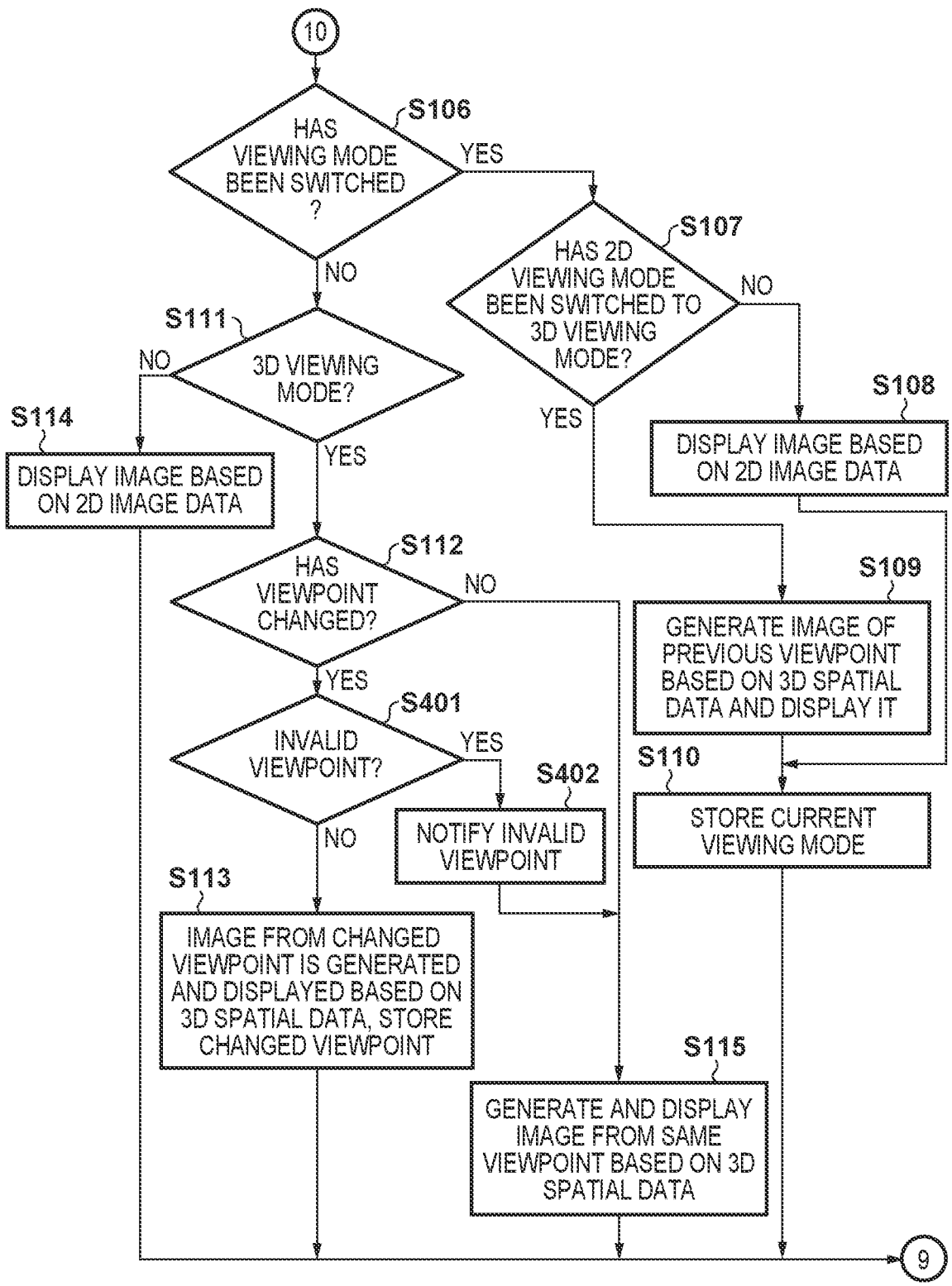

FIGS. 15A and 15B illustrate a flowchart of viewing processing in which image data captured by the image capturing system shown in FIG. 1 is viewed by the information processing apparatus 1 shown in FIG. 9 in the fourth embodiment. Note that processes similar to those shown in FIG. 6 are given the same reference numerals, and descriptions thereof will be omitted as appropriate.

If it is determined in step S112 that a new viewpoint is designated, it is determined in step S401 whether the designated viewpoint is included in the invalid viewpoint data, and if not, the process advances to step S113. On the other hand, if the designated viewpoint is included in the invalid viewpoint data, the process advances to step S402, where the viewer is notified that the designated viewpoint is invalid, and then the process advances to step S115, where the image viewed from the current viewpoint is generated and displayed.

As described above, according to the fourth embodiment, images viewed from viewpoints that the camera operator does not want to show to the viewer can be prevented from being displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-034928, filed Mar. 7, 2023 which is hereby incorporated by reference herein in its entirety.

What is claimed is:

1. An information processing apparatus comprising one or more processors and/or circuitry which function as:
   an input unit that inputs first image data used to display an image in a first mode and second image data used to display an image in a second mode, and information on a predetermined invalid viewpoint that prohibits image generation;
   a switching unit that switches between the first mode and the second mode;
   a generation unit that generates an image viewed from an arbitrary viewpoint based on the second image data;
   a designation unit that designates a viewpoint of an image to be generated by the generation unit; and
   a storage unit that stores the viewpoint of the image generated by the generation unit,
   wherein the first image data and the second image data are image data obtained by shooting a same subject in parallel with a plurality of image capturing apparatuses,
   wherein if a viewpoint is stored in the storage unit in a case where the first mode is switched to the second mode, the designation unit designates the viewpoint stored in the storage unit, and
   wherein, in a case where the viewpoint designated by the designation unit is the invalid viewpoint in the second mode, the generation unit generates an image viewed from the viewpoint stored in the storage unit without generating an image of the invalid viewpoint.

2. The information processing apparatus according to claim 1, wherein the first image data is two-dimensional image data whose viewpoint cannot be changed, and the second image data is three-dimensional spatial data and an image viewed from an arbitrary viewpoint can be generated using the second image data.

3. The information processing apparatus according to claim 1 further comprising an output unit that outputs an image based on the first image data to a display unit in the first mode, and outputs an image generated by the generation unit to the display unit in the second mode.

4. The information processing apparatus according to claim 1 further comprising a display unit that displays an image based on the first image data in the first mode, and displays an image generated by the generation unit in the second mode.

5. The information processing apparatus according to claim 1 further comprising a detection unit that detects a predetermined subject from the second image data in a case where a tracking mode for tracking the predetermined subject is set in the second mode;
wherein the designation unit changes the viewpoint to track the predetermined subject based on a detection result by the detection unit when the tracking mode is set.

6. The information processing apparatus according to claim 1, wherein the input unit further inputs information indicating a scene change, and
wherein if a scene changes while displaying an image in the second mode, the designation unit specifies a predetermined viewpoint.

7. The information processing apparatus according to claim 1, wherein the input unit further inputs information indicating a scene change, and
wherein if a scene changes while displaying an image in the second mode, the switching unit switches to the first mode.

8. The information processing apparatus according to claim 1, wherein the input unit further inputs tracking information that specifies a position of a subject in the second image data, and
wherein, in a case where a tracking mode for tracking a predetermined subject is set in the second mode, the designation unit changes the viewpoint so as to track the subject specified by the tracking information.

9. The information processing apparatus according to claim 1 further comprising a notification unit that notifies that, in a case where a viewpoint designated by the designation unit is the invalid viewpoint, the designated viewpoint is the invalid viewpoint in the second mode.

10. An information processing method comprising:
inputting first image data used to display an image in a first mode and second image data used to display an image in a second mode, and information on a predetermined invalid viewpoint that prohibits image generation;
switching between the first mode and the second mode;
designating a viewpoint of an image to be displayed in the second mode;
generating an image viewed from the designated viewpoint based on the second image data in the second mode;
storing the viewpoint of the generated image in a storage unit,
wherein the first image data and the second image data are image data obtained by shooting a same subject in parallel with a plurality of image capturing apparatuses,
wherein if a viewpoint is stored in the storage unit in a case where the first mode is switched to the second mode, the viewpoint stored in the storage unit is designated, and
wherein, in a case where the viewpoint designated by the designation unit is the invalid viewpoint in the second mode, the generation unit generates an image viewed from the viewpoint stored in the storage unit without generating an image of the invalid viewpoint.

11. The information processing method according to claim 10 further comprising outputting an image based on the first image data to a display unit in the first mode, and outputting the generated image to the display unit in the second mode.

12. A non-transitory computer-readable storage medium, the storage medium storing a program that is executable by a computer, wherein the program includes program code for causing the computer to function as an information processing apparatus comprising:
an input unit that inputs first image data used to display an image in a first mode and second image data used to display an image in a second mode, and information on a predetermined invalid viewpoint that prohibits image generation;
a switching unit that switches between the first mode and the second mode;
a generation unit that generates an image viewed from an arbitrary viewpoint based on the second image data;
a designation unit that designates a viewpoint of an image to be generated by the generation unit; and
a storage unit that stores the viewpoint of the image generated by the generation unit,
wherein the first image data and the second image data are image data obtained by shooting a same subject in parallel with a plurality of image capturing apparatuses,
wherein if a viewpoint is stored in the storage unit in a case where the first mode is switched to the second mode, the designation unit designates the viewpoint stored in the storage unit, and
wherein, in a case where the viewpoint designated by the designation unit is the invalid viewpoint in the second mode, the generation unit generates an image viewed from the viewpoint stored in the storage unit without generating an image of the invalid viewpoint.

* * * * *